United States Patent [19]  
Morley

[11] 4,427,701  
[45] Jan. 24, 1984

[54] FROZEN YOGURT PRODUCT

[75] Inventor: Robert G. Morley, Stone Mountain, Ga.

[73] Assignee: Landwide Foods, Inc., Dover, Mass.

[21] Appl. No.: 383,767

[22] Filed: Jun. 1, 1982

Related U.S. Application Data

[63] Continuation-in-part of Ser. No. 210,846, Nov. 26, 1980, Pat. No. 4,346,120.

[51] Int. Cl.³ .................. A23G 9/02; A23G 9/04; A23C 9/123; A23C 9/13
[52] U.S. Cl. .................................... 426/36; 426/43; 426/39; 426/565; 426/567; 426/583
[58] Field of Search .............. 426/565, 566, 567, 583, 426/36, 42, 39

[56] References Cited

U.S. PATENT DOCUMENTS

| | | | |
|---|---|---|---|
| 1,445,200 | 2/1923 | Bullard et al. | 426/565 |
| 1,659,723 | 2/1928 | Cosler | 426/565 |
| 1,781,249 | 11/1930 | Scholl | 426/565 |
| 1,878,203 | 9/1932 | Turnbow | 426/565 |
| 2,139,836 | 12/1938 | London | 99/136 |
| 2,168,934 | 8/1939 | Hoskins et al. | 99/136 |
| 2,558,453 | 6/1951 | Minster | 99/136 |
| 2,738,279 | 3/1956 | Stimpson et al. | 99/136 |
| 3,479,187 | 11/1969 | Arbuckle | 99/60 |
| 3,535,122 | 10/1970 | Mussellwhite et al. | 99/136 |
| 3,647,472 | 3/1972 | Speech et al. | 99/34 |
| 3,702,768 | 11/1972 | Finucane et al. | 99/136 |
| 3,826,829 | 7/1974 | Marulich | 426/190 |
| 3,845,223 | 10/1974 | Moneymaker et al. | 426/164 |
| 3,897,571 | 7/1975 | Homler et al. | 426/327 |
| 3,949,102 | 4/1976 | Hellyer et al. | 426/566 |
| 3,993,793 | 11/1976 | Finney | 426/565 |
| 4,110,476 | 8/1978 | Rhodes | 426/583 |
| 4,145,454 | 3/1979 | Dem et al. | 426/565 |
| 4,146,652 | 3/1979 | Kahn et al. | 426/564 |
| 4,154,863 | 5/1979 | Kahn et al. | 426/553 |
| 4,178,390 | 12/1979 | Igoe | 426/43 |
| 4,199,604 | 4/1980 | Kahn et al. | 426/327 |
| 4,199,605 | 4/1980 | Kahn et al. | 426/330.6 |
| 4,219,581 | 8/1980 | Den et al. | 426/565 |
| 4,293,573 | 10/1981 | Bradley, Jr. et al. | 426/583 |
| 4,308,287 | 12/1981 | Kahn et al. | 426/583 |

FOREIGN PATENT DOCUMENTS

| | | | |
|---|---|---|---|
| 2017187 | 11/1977 | United Kingdom | 426/565 |
| 1508437 | 4/1978 | United Kingdom | 426/565 |

OTHER PUBLICATIONS

Arbuckle W. S., Ph.D., *Ice Cream, Second Edition*, Avi Publishing Co., Inc., Westport, Conn. (1972).
Glicksman, Martin (General Foods Corp.), "Hydrocolloids" pp. 2-1 through 2-25.
Ross, O. E., (National Pectin Products Company, Chicago, Illinois), "Sherberts for Tommorrow's Markets", pp. 1-3.
"Distinctive Desserts, The New Soft-Serve Recipe Book from Taylor Freezer", ®1971 by Taylor Freezer, Rockton, Illinois.
Sommer, Hugo H., Ph.D., "The Theory and Practice of Ice Cream Making", Sixth Edition, 1951, published by the author, Madison, Wisconsin.

*Primary Examiner*—Jeanette M. Hunter
*Attorney, Agent, or Firm*—Lahive & Cockfield

[57] ABSTRACT

A frozen yogurt product, which emulates features of conventional soft serve frozen yogurt but at the lower temperatures of home freezers, has a unique composition with multiple stabilizers, multiple emulsifiers, and multiple sugars, is incubated in multiple stages, and is aerated to a selected specific gravity.

18 Claims, 1 Drawing Figure

FROZEN YOGURT PRODUCT

REFERENCE TO RELATED APPLICATIONS

This application is a continuation-in-part of co-pending U.S. application Ser. No. 210,846 filed Nov. 26, 1980 now U.S. Pat. No. 4,346,120, entitled "Frozen Dessert Product", and is related to co-pending U.S. applications Ser. Nos. 228,557 now U.S. Pat. Nos. 4,400,406 and 228,550, now U.S. Pat. No. 4,400,405 both filed Jan. 26, 1981, entitled "Frozen Dessert Food" and "Dietetic Frozen Dessert Food", respectively, the disclosures of which are incorporated herein by reference.

BACKGROUND OF THE INVENTION

This invention provides a new frozen food product, principally for dessert use, that emulates the features of conventional soft serve frozen yogurt but at such lower temperatures as to be suitable for prolonged storage in store and home freezers. The invention embraces a composition of ingredients and processing steps which provide the new frozen yogurt product.

Soft serve frozen yogurt is a highly popular dessert with wide appeal. The soft serve industry, of which the soft serve frozen yogurt industry is a part, has grown to such an extent that it is recognized as a distinct segment of the frozen dessert field and encompasses manufacturers and retailers of soft serve products, and suppliers of processing equipment for the product.

Distinguishing features of conventional soft serve frozen yogurt are that it is frozen in a special soft serve freezer, is dispensed by extrusion at carefully chosen sub-freezing temperatures and stands up on a cone or dish upon extrusion. Soft serve frozen yogurt generally is consumed almost immediately after extrusion from the soft serve freezer and hence essentially at the extrusion temperature.

Although soft serve frozen yogurt of this character has been marketed for nearly a decade, it is still available only from stores having special freezers that dispense the product for immediate consumption. This is because the product is dispensed at temperatures between 16° F. and 21° F. (−9° C. to −6° C.). At lower temperatures, the product is no longer soft, but rather it tends to be so hard that it is unsatisfactory for commercial sale. Conventional soft serve frozen yogurt accordingly is not suited for sale from grocery store freezers for home storage and dispensing. Home freezers maintain temperatures generally around 0° F. to 10° F. (−18° C. to −12° C.), and store freezers, which as used herein includes grocery store, supermarket, and restaurant freezers, are generally at colder temperatures.

Although others have expended considerable effort to develop a soft serve product for home use, apparently without success, there is no mention of soft serve frozen yogurt for home use in the prior art. U.S. Pat. Nos. 4,146,652; 4,154,863; 4,199,605; 4,199,604; 4,145,454; and 3,993,793 and U.K. Patent Specification No. 1,508,437 disclose frozen food products which supposedly are softer than usual at freezer temperatures; however, none appears to provide a soft serve-like frozen yogurt product suitable for purchase from a store freezer and storage in a home freezer. There is considerable other published art on the subject of frozen desserts, particularly ice cream. One example of the art is a recent text, *Ice Cream, Second Edition* by W. S. Arbuckle, Ph.D., published in 1972 by the Avi Publishing Company, Inc., Westport, Connecticut.

It is accordingly an object of this invention to provide a soft serve frozen yogurt product suited for home freezer storage.

It is a further object of the invention that the soft serve frozen yogurt product be suited for storage in a home freezer and for dispensing by extrusion directly after removal from that freezer.

The invention accordingly seeks to provide a frozen food product which emulates features of conventional soft serve frozen yogurt but at the significantly lower temperatures standard in home freezers.

It is also an object of the invention to provide a frozen yogurt product of the above character which existing commercial frozen yogurt and qualified frozen food distribution companies can store and distribute at the temperatures of available equipment, generally in the order of 0° F. to −10° F. (−18° C. to −23° C.), with high retention of body, texture, volume, and taste for at least six months.

Other objects of the invention will in part be obvious and will in part appear hereinafter.

The invention accordingly comprises a frozen product possessing the features, the properties, and the relation of components which will be exemplified in the soft serve frozen yogurt product hereinafter described, and the several steps and the relation of such steps with respect to each of the others as exemplified in the process hereinafter set forth. The scope of the invention is indicated in the claims.

BRIEF DESCRIPTION OF DRAWING

For a fuller understanding of the nature and objects of the invention, reference should be made to the following detailed description and the accompanying drawing, which is a graphical representation of yield strength as a function of temperature for a soft serve product related to the soft serve frozen yogurt product of the invention and for three prior dessert products.

THE INVENTION

Figure 1:
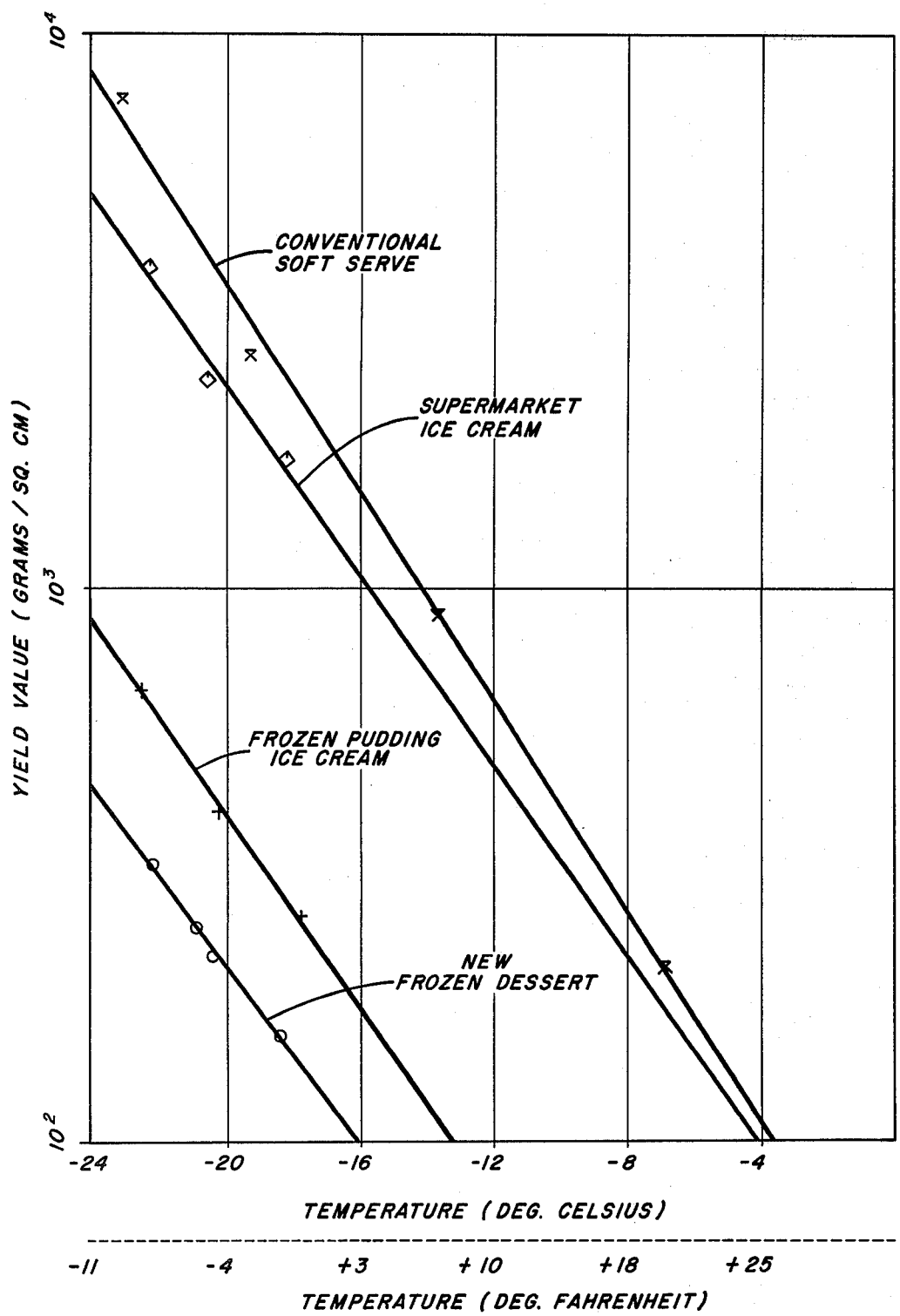

The features of conventional soft serve frozen yogurt which are important to consumers include the organoleptic properties of taste, after taste, and mouth feel. Many of these are subjective properties and hence not readily measured or quantified. For example, one important taste which has been difficult to attain in a frozen yogurt which is soft enough for extrusion at home freezer temperatures is the absence of a burning sensation. Features of standard soft serve frozen yogurt also include the ability to be extruded and to retain the extrudate shape, the ability to stand up in a cone or dish without sagging, sufficient body strength so as not to slip or fall sideways when the cone or dish tips, and the proper bite resistance so that the consumer can either lick the product or bite and chew it with a satisfactory mouth feel. The soft serve frozen yogurt is to retain all of these properties, in addition to resistance to melting and dripping, for a sufficient time—typically ten minutes at room temperature, e.g., 68° F.—until the serving is eaten.

Other properties of a frozen dessert that is to be sold in a grocery store for home storage and dispensing by extrusion include prolonged storage life without deterioration, whether visible or taste perceptable. The product is also to resist thermal shock, i.e., resist deterioration when subjected to varying temperatures. Temperature variations occur normally in a freezer as the equipment cycles, especially through frost-free operation. An extreme thermal shock occurs when the product is warmed to a near melting temperature and then rechilled to a freezer temperature, as can occur during transfer of the product from the store freezer to the home freezer.

Stated more technically, a soft serve frozen yogurt dessert that can be dispensed by extrusion requires deformation and flow properties, i.e., rheological characteristics, that enable the frozen product, when subjected to reasonable extrusion forces, to become sufficiently fluid to flow through the extrusion nozzle. This performance involves the rheological characteristic termed shear thinning. The extruded product, however, must essentially immediately set-up, i.e., lose the shear-responsive fluidity, in order to retain the extrudate shape and to stand up on a cone or dish. Yet the extruded product preferably is sufficiently bondable upon extrusion to be coiled on itself as does conventional soft serve yogurt. These characteristics of the frozen yogurt dessert product may be called coneability. Commercial soft serve frozen yogurt is coneable in that it can be extruded with a rod-like shape and immediately coiled in sequential layers on a cone or dish to provide a spiraled serving that tends to retain its shape.

The attaining of this performance with a product at home freezer temperature requires flow properties different from those of conventional soft serve frozen yogurt. They also are different from those of regular frozen yogurt, which cannot be dispensed by extrusion when at home freezer temperatures, but rather requires, as known, scooping or dipping with a tool.

Properties of the frozen material important to attaining the foregoing extrudability and coneability include yield value at the desired extrusion temperature, viscosity, shear thinning value at the extrusion temperature and shear rate, relaxation time, and lateral resistance.

Yield value is a measure of the material strength and particularly, the resistance to deformation and flow. Yield value is commonly determined from measurements made with a cone penetrometer. A material with too high a yield value is unduly hard, and too low a value means the material is unduly soft. A moderate yield value is desired in order that the product be extrudable with hand pressure. The yield value for the soft serve frozen yogurt disclosed herein at home freezer temperature (about 0° F.) should be no higher than that of conventional soft serve frozen yogurt at extrusion temperature (18° F.).

Shear thinning value determines the rate at which a material flows under particular conditions. It is the relative drop in viscosity of the material when subjected to the shear stress and shear rate which cause extrusion at the specified temperature, with the particular orifice configuration used, and at the desired flow rate. The desired value for this invention yields a sufficient flow to dispense a serving of the frozen yogurt product within a few seconds.

Relaxation time is the time, typically in seconds, for the frozen yogurt product to set up after extrusion at the specified temperature. It is measured as the time required for the yield value of the frozen yogurt to return to 63.2% of its pre-extrusion value after removal of the pressure which induced the extrusion flow. The relaxation time should be sufficiently long to allow successive coiled layers of the extruded frozen yogurt to bond together, but short enough so that a cone of the material can be handled, and even tipped, promptly after being dispensed.

Lateral resistance is the elastic strength of the material to resist deformation. The lateral resistance important in the context of this invention can be measured as the force necessary to bend permanently a cylindrical or other rod-shaped extrudate of the frozen product, with given dimensions, at the extrusion temperature. This lateral resistance hence identifies the ability of an extruded conical serving of the product to maintain the extruded shape, e.g., to resist deflection and bending, and for layers of the product to stand up in tiers.

It has been found that a new soft serve frozen yogurt product can be formulated and prepared which amply satisfies the foregoing objectives and criteria. The product is prepared ready for consumption and packaged for a consumer to purchase from a store freezer. The consumer stores the product in a home freezer, which as used herein includes the freezer section of a home refrigerator, and dispenses the soft serve frozen yogurt product directly from the package for consumption. The product preferably is in a package which can be manipulated to extrude the soft serve frozen yogurt product under hand pressure to yield a serving which is essentially the same in appearance, as well as in taste, as conventional soft serve frozen yogurt dispensed from a soft serve freezer.

The soft serve frozen yogurt product of the invention is formulated with ingredients which provide the protein, water, flavor constituents common in frozen yogurt, yogurt culture, and the optional fat, and further containing unique multi-ingredient sugar, stabilizer and emulsifier systems. The attainment with these ingredients of the fine taste, the pleasing mouth feel, and the exacting rheological properties required for a household soft serve frozen yogurt is deemed unexpected and not predictable.

One particular feature of the invention is a soft serve frozen yogurt that has both unusually low specific gravity and substantial body and chewiness. The formulation of the new product enables it to be whipped with significantly more air than is common for conventional soft serve frozen yogurt and thereby to attain the desired low specific gravity. The ice cream, frozen yogurt and soft serve frozen product industries describe the amount of air in a product as overrun. This term measures the percentage by which the volume of the liquid mix for a product is increased during whipping and freezing. Thus, when one gallon of mix produces two gallons of finished product, the overrun is 100%.

The overrun of the soft serve frozen yogurt product of this invention typically is greater than 100% and can exceed 200%. This is more than twice the overrun normally found in conventional soft serve frozen yogurt (40-60%). It is understood that conventional soft serve frozen yogurt mix cannot take 200% overrun and remain appetizing. By contrast, the new product is highly appetizing. In fact, the body, texture and mouth feel of the new product have been judged to be very acceptable and satisfactory.

Another particular feature of this invention is a soft serve frozen yogurt that is essentially free of "burn". Consumers have identified this perception of a burning sensation on the tongue and in the throat as a serious drawback of products with depressed freezing points. It is believed that the sensation is due to dehydration caused by the additional sugars commonly used as freezing-point depressants. The prior heavy use of sugars also has caused a cloying sweetness.

The new soft serve frozen yogurt attains significant freezing point depression without a significant burn sensation and without undue sweetness. The invention attains these distinct advantages by combining a unique sugar system with the relatively high overrun.

The ingredients are now described further, beginning with the more common ones. If one of the ingredients is varied, the others may also be varied to achieve optimum results. The optional fat constituent, when present, aids in providing a creamy taste and the eating characteristic associated with yogurt-like products. It also contributes to the smoothness, the body and the melting resistance of the soft serve frozen yogurt. The amount of fat in the product is generally within the range of 0% to 5% by weight of the product. The exact amount of fat is not critical, although the amounts of other ingredients generally are to be adjusted as the amount of fat is changed. The general amount and character of the fat in part relates to the amount of water in which it is emulsified. If too much fat is present, the soft serve frozen yogurt may be unduly firm and unsuitable for home freezer extrusion. The fat constituent typically is provided in the form of triglyceride fats and/or oils, and milk fat and/or butter fat are preferred. Hence dairy cream and milk are preferred fat sources. Other edible fats and oils are believed suitable, provided they have a solid fat index within the level desired for taste and performance. Different fats can be used alone or in combination with one another, including the combination of vegetable fats with milk fat. Vegetable oils and fats which are suitable sources of the edible triglycerides include cottonseed oil, soybean oil, corn oil, sunflower oil, palm oil, palm kernel oil, peanut oil, rice oil, safflower oil and coconut oil; these fats may be partially or substantially hydrogenated.

The protein in the new soft serve frozen yogurt product functions to promote high overrun. If the protein level is too low, the soft serve frozen yogurt does not whip well and fails to hold the desired overrun. If the protein level is too high, the mixture would be unduly thick to process.

The preferred source of the protein constituent of the new dessert product is milk solids not fat (MSNF). Milk solids not fat used in the preferred composition according to the invention aid in providing the desirable properties of whipping ability, smoothness, body, mouth feel, melt resistance, lowering of freezing point, and some sweetness. The lactose or milk sugar present in the MSNF additionally acts as a substrate for the yogurt bacteria to use to produce lactic acid and flavor. The MSNF can be derived from cream, milk and non-fat dry milk, or solely from non-fat dry milk with the addition of water. Buttermilk can also be used for a portion of the MSNF. Other protein sources with which the invention can be practiced, generally as substitution for a portion of the MSNF, include milk derived solids such as sweet dairy whey, neutralized acid whey, modified whey, whey protein concentrate, casein, modified casein, sodium caseinate, and calcium caseinate. The protein constituent generally accounts for 4% to 5.5% by weight of the new dessert, with 4.6–5.2% considered preferable.

The water of the new soft serve frozen yogurt product generally constitutes from 50% to 60% by weight of the product, including the water present in other ingredients, e.g., milk and cream. Water preferably constitutes around 54–58% of the product.

If no flavoring constituent is added, the frozen yogurt mix will yield a plain yogurt flavor. If a different flavor is sought, the flavoring constituent of the new soft serve frozen yogurt is selected from known flavoring ingredients according to the desired taste, taking into account the other ingredients. This constituent includes, by way of illustration, cocoa, fruits, nuts, and the like as well as other flavorings, both natural and artificial. Note, however, that the ingredient ranges specified herein are for an unflavored product and for a product flavored with a concentrate, e.g., vanilla, present in only a small amount by weight. Those skilled in the art will comprehend the adjustments appropriate for the particular flavoring used.

The sugar constituent of the new soft serve frozen yogurt is a combination of saccharides that provides simultaneous control of freezing point depression, sweetness, body and texture, and flavor. The effects in frozen yogurt of added saccharides in contributing to sweetness and in lowering freezing point are known at least in general terms, but the provision of a sugar system that provides a simultaneous blend of organoleptic and material properties required for a household soft serve frozen yogurt is considered to be novel. The added sugar to attain these objectives, i.e., in addition to sugars present in the milk solids and other constituents of the product, is in the range of 22–30%, with 24–28% being preferred. Typically the added sugar plus the sugar in milk solid ingredients constitutes on the order of 31–35% by weight of the product.

The saccharide system of the invention, which as noted is considered important in providing a soft serve frozen yogurt having no significant perception of burn, preferably has fructose, sorbitol and corn syrup as at least the major sugar ingredients. The corn syrup considered preferable is 36 DE (dextrose equivalent), while if a no fat product is made, 24 DE is also added. The sugar system may, however, employ other saccharides, depending at least in part on the subjective properties desired for the final product. Suitable other sugars are sucrose, dextrose, mannitol and fructose corn syrups. It has, for example, been found that dextrose can replace all or part of the sorbitol, but generally a less desirable flavor results, in particular a burning sensation is experienced upon total replacement.

It is understood that sugar systems employing a combination of sorbitol and fructose have heretofore been used in certain diabetic ice creams, which of course have significantly different mechanical properties from a soft serve frozen yogurt. It further is understood, however, that this prior sugar system did not also employ corn syrup, as found in the practice of the present invention. It also is understood that the new soft serve frozen yogurt of this invention employs a significantly larger added sugar constituent than known diabetic ice cream.

The stabilizer constituent of the invention also contributes to the attainment of the desired performance features of the new household dessert. It is selected to improve the ability of the product to withstand commercial shelf life and heat shock without undue deterioration while assisting in the ability of the product to hold the overrun. The stabilizer element contributes to these objectives by providing a combination of stabilization, gelling and blocking functions as well as acting as a protective colloid. The stabilizing constituent of the invention typically is in the range between 0.5% to 1.1% by weight of the entire product. The amount varies however with factors including the amount of water and the strength of the stabilizers employed. It is hence considered that features of the invention can be realized with a stabilizer constituent within the broader range of 0.25% to 1.3%.

In practice, the stabilizer system employs at least one stabilizer from each of at least three groups of stabilizers, namely insoluble blocking agents, water-binding stabilizing gums, and gelling agents. The blocking agent is present in an amount generally between 0.1% and 1.0% of the total product, preferably 0.25-0.5%. Preferred examples of the insoluble blocking agent are microcrystalline cellulose and cellulose fibers. The stabilizing gum is present in a range generally between 0.07% and 0.3% with 0.12%-0.2% preferable. The gum is selected from a group consisting of locust bean gum, guar gum, propylene glycol alginate, tara gum, sodium carboxymethyl cellulose (CMC), and other cellulose ethers such as methylcellulose, hydroxypropylcellulose and hydroxypropylmethyl cellulose. The gelling agent is present in an amount generally ranging between 0.1% and 0.5%, preferably 0.168%-0.365%, of the total product and is selected from gelatin, xanthan gum, carrageenan, sodium alginate and pectin.

Where it is desired that the product include a wheying-off (syneresis) protective agent, the gelling agent carrageenan can additionally provide this function.

A stabilizer system considered preferable for practice of the invention consists essentially of microcrystalline cellulose, locust bean gum, guar gum, gelatin, hydroxypropylmethyl cellulose and carrageenan. Those skilled in the art will recognize that several of the constituents may perform multiple functions. For example, gelatin can serve both as a stabilizing gum and a gelling agent while carrageenan provides the functions of a gelling agent, a stabilizng gum and as a protective colloid.

The emulsifier constituent of the invention is in most instances present in the range between 0.45% to 0.775% of the total product and employs ingredients from two emulsifier groups. One emulsifier group is a whipping agent, examples of which are mono- and diglycerides, and distilled monoglycerides. The second category of emulsifier is a drying agent, examples of which are polysorbate 80, polysorbate 65, and ethoxylated mono- and diglycerides.

Emulsifier systems found preferable for practice of the invention consist essentially of a combination of mono- and diglycerides and polysorbate 80 with distilled monoglycerides utilized if a non-fat final product is sought.

A yogurt culture consisting essentially of lactobacillus bulgaricus and streptococcus thermophilus organisms is used to innoculate the milk portion of the constituents. In a preferred embodiment, the ratio of the two bacteria strains is 1:1. The innoculation cultures may be freeze dried or frozen concentrated, or another batch of yogurt containing live organisms may be utilized as the innoculation culture. If a freeze dried culture (for example, CH3 from Christian Hansen's Lab, Inc.) is used as an innoculant, approximately 2 gm. of culture per gallon of yogurt portion is needed while 14 gm. of frozen concentrate culture is needed per gallon. If the innoculant is a bulk starter culture, use about 4% by weight.

In addition to the foregoing ingredients, the household soft serve frozen yogurt of the invention can include other ingredients, non-limiting examples being lower chain monohydric and polyhydric alcohols, starches, inorganic salts, and pH buffering agents.

The preparation of the soft serve frozen yogurt according to the invention employs processing equipment conventional for ice cream and frozen yogurt, both hard and conventional soft serve, but as set forth below differs from the overall conventional processing. The milk and other dairy products are combined with the chosen emulsifiers and the mixture is pasteurized to ensure a sterile environment for growth of the yogurt producing organisms. A preferred pasteurization cycle is 30 minutes at 180° F. (82° C.). The sterile mixture is then homogenized while hot to form an oil-in-water emulsion. The homogenization can be carried out in standard two-stage homogenizing equipment. This equipment is preferably operated with an homogenization pressure in the first stage on the order of 2,000 psi and a second stage pressure on the order of 500 psi. These pressures, however, are not considered critical, and other homogenizing pressures can be used.

The sterile mixture is then cooled to incubation temperature and innoculated with the yogurt culture. The incubation temperature depends on the duration of incubation period preferred; preferred incubations are about 4 hours at 106°-110° F. (41°-43° C.) or 16-18 hours (overnight) at 92° F. (33° C.). Incubation is continued until the desired titratable acidity level is reached. Typically, the acidity level is 1-1.6% in the yogurt portion but the level depends on the final flavor desired in the finished product. The acidity level is not critical to the physical characteristics of the product.

While the yogurt culture is incubating, the sugars and stabilizers are mixed with the proper water level and that mixture is pasteurized. After pasteurization, the resulting sugar syrup is cooled to approximately 90° F. (32° C.).

After the requisite level of acidity has been reached, the yogurt "set" is broken by adding the sugar syrup while stirring. If additional sugar is to be added, i.e., not all the sugar could go into the sugar syrup, it can be added in dry form at this point. The completed soft serve yogurt mix is then cooled to 40° F. (4.5° C.).

The cooled soft serve yogurt is then subjected to freezing and aeration. The aeration is sufficient to reduce the specific gravity, which otherwise has a value greater than unity, to the range of between 0.36 and 0.54; preferably to a value between 0.38 and 0.44. These values of specific gravity of the resultant product correspond to overruns ranging between 100% and 220%, and preferably between 160% and 200%. Beyond the preferred specific gravity range, the product is generally considered acceptable, but outside the wider range the product is considered unsatisfactory with regard to desirable eating properties and extrudability.

The freezing and aeration can, for example, be performed with a conventional ice cream freezer which whips the product while dropping its temperature to below freezing. The whipping and freezing operation is continued until the product has attained the desired specific gravity at a temperature below 24° F., preferably in the range of 15° F. to 20° F. The product is removed from the equipment at this temperature and packaged, after which the packaged product is hardened by reducing the temperature to below 0° F. The freezing and whipping operation can include the injection of gas. The gas can, by way of non-limiting examples, be air, nitrogen, carbon dioxide, nitrous oxide or a combination of these gaseous fluids. The whipping and freezing step can also be performed by whipping the product to the desired specific gravity within the range stated, typically in the commercially known Oakes brand or Votator brand high-shear whipping equipment, and then blast freezing the whipped product to accomplish the freezing and hardening process in one step. The latter operation can also be carried out with the noted injection of gas under pressure.

The resultant product, with the composition and overrun previously described, possesses the desired physical and organoleptic properties discussed above. It accordingly fully meets the required and desired properties for the new soft serve frozen yogurt. The package for the product can be a closed envelope with an extrusion orifice which the consumer can squeeze to subject the soft serve frozen yogurt to pressure which extrudes the product from the nozzle, much in the way that conventional soft serve frozen yogurt is extruded from a commercial freezer. But the new soft serve frozen yogurt of this invention possesses these properties at home freezer temperatures, whereas conventional soft serve frozen yogurt is dispensed at significantly higher temperatures and utterly fails to exhibit these properties at home freezer temperatures.

EXAMPLE 1

One example of the new soft serve frozen yogurt formulated and processed in the foregoing manner and deemed preferable for practice of the invention is prepared in the foregoing manner. This formulation yields a soft serve frozen yogurt product containing the following final level of constituents by weight.

- 5.0% Fat
- 13.0% MSNF
- 3.8% Fructose
- 12.5% Sorbitol
- 8.5% 36 DE Corn Syrup Solids
- 0.39% Mono-and Diglycerides
- 0.06% Polysorbate 80
- 0.25% Avicel RC 591
- 0.15% Gelatin 225 Bloom
- 0.075% Locust Bean Gum
- 0.05% Guar Gum
- 0.018% Carrageenen
- 0.183% Salt
- 4.0% Yogurt Culture
- Balance Water The product is formulated by mixing an incubated yogurt portion with a sugar portion and homogenizing. The yogurt portion consists of:

- 8.33% Fat, provided as butter fat
- 21.66% MSNF, provided as milk and milk powder
- 0.65% Mono-and diglycerides (for example, Durem 207 marketed by the Durkee Company)
- 0.1% Polysorbate 80
- Balance Water The yogurt mixture is pasteurized for 30 minutes at 180° F. then homogenized at 180° F. using 2000 psi on the first stage and 500 psi on the second stage. The homogenized yogurt mixture is cooled to 110° F., innoculated with yogurt culture, and allowed to incubate until the titratable acidity reaches 1.3%. The preferred yogurt culture consists of a mixture of lactobacillus bulgaricus and streptococcus thermophilus organisms in a 1:1 ratio.

Simultaneously with the incubation of the yogurt portion, the sugar portion is formulated as follows:

- 9.5% Fructose, provided as crystalline fructose (for example, marketed by Hoffman-LaRoche Company)
- 31.25% Sorbitol
- 21.25% 36 DE Corn Syrup Solids (for example, Star Dri 35R marketed by A.E. Staley Co.)
- 0.625% Microcrystalline cellulose (Avicel RC 591)
- 0.375% Gelatin 225 Bloom
- 0.1875% Locust Bean Gum (for example, FL 70/50 marketed by Hercules Company)
- 0.125% Guar Gum (for example, Hercules FG 60/70)
- 0.045% Carrageenan (for example, Hercules Genulacta L100)
- 0.4575% Salt
- Balance Water The sugar portion is pasteurized at 175° F. for a short time then cooled to 90° F.

Two parts of the sugar portion are mixed with 3 parts of the yogurt portion while the mixture is cooled to 40° F. The resulting soft serve yogurt mix is then frozen as previously described to achieve the final product.

EXAMPLE 2

Example 1 illustrated a 5% fat soft serve frozen yogurt product. The present example illustrates a non-fat soft serve frozen yogurt product made using the same process. The formula for the finished product is as follows.

- 0.0% Fat
- 11.0% MSNF
- 3.5% Modified whey protein (for example, Fortein 35 marketed by Foremost Foods)
- 4.3% Fructose
- 12.2% Sorbitol
- 7.0% 36 DE Corn Syrup Solids
- 3.8% 24 DE Corn Syrup Solids
- 0.45% Distilled monoglycerides
- 0.26% Mono- and diglycerides
- 0.065% Polysorbate 80
- 0.5% Avicel RC 591
- 0.35% Gelatin Bloom 225
- 0.12% Hydroxypropylmethyl Cellulose (for example, Methocel K15M Premium)
- 0.08% Locust bean gum
- 0.0135% Carregeenan
- 0.191% Salt
- 4.0% Yogurt Culture
- Balance Water The yogurt portion is incubated with the same yogurt culture as in Example 1 after innoculation. The yogurt portion contains:

- 18.33% MSNF
- 0.75% Distilled Monoglycerides
- 0.432% Mono- and Diglycerides
- 0.108% Polysorbate 80
- Balance Water The sugar portion of the non-fat yogurt mix contains:

- 29.8% 36 DE Corn Syrup Solids
- 16.2% 24 DE Corn Syrup Solids
- 14.9% Fortein 35
- 2.128% Avicel RC 591
- 1.49% Gelatin 225 Bloom
- 0.51% Hydroxypropylmethyl Cellulose
- 0.34% Locust Bean Gum
- 0.0574% Carrageenan
- 0.82% Salt
- Balance Water The non-fat soft serve frozen yogurt illustrated herein requires added dry sugar as well as the sugar portion of the mix. The dry sugar portion consists of:
74.0% Sorbitol
26.0% Fructose The yogurt breaking process is identical to that described in Example 1 except 3.636 parts of the yogurt portion were mixed with 1.424 parts of the sugar mixture and 1 part of the dry sugar portion.

The product is prepared as described, with an overrun preferred about 160% and 200%.

The soft serve frozen yogurt satisfies the desired deformation and flow properties at home freezer temperatures as discussed above, as well as withstanding prolonged freezer storage. The product accordingly is indeed readily extrudable, by hand pressure on a collapsible pliable container, immediately upon removal from prolonged storage in a home freezer.

TEST EXAMPLE

More extensive tests of the organoleptic and the rheological properties of soft serve-like frozen foods extrudable and coneable at home freezer temperatures have been conducted with a non-yogurt product similar in some respects to the soft serve frozen yogurt product of this invention but is not acidic or yogurt flavored. This frozen dessert, designated below as "test" to distinguish it from the soft serve frozen yogurt product of Examples 1 and 2, was prepared with the following ingredients in the manner described above, taking into account the lack of yogurt culture and the different ingredients.

11% Fat, provided as butter fat
11% MSNF, provided as milk and milk powder
3% Fructose, provided as crystalline fructose (as marketed for example by the Hoffman-LaRoche Company)
10.8% Sorbitol
10.0% Corn Syrup Solids (for example Star Dri 35R as marketed by A. E. Staley Co.)
0.25% Microcrystalline Cellulose (for example Avicel RC591 as marketed by FMC Corporation)
0.15% Gelatin (Bloom strength 225)
0.07% Locust Bean Gum (for example FL 70/50 as marketed by Hercules Company)
0.05% Guar Gum (for example Hercules FG 60/70)
0.02% Carrageenan (for example Hercules Genulacta L100)
0.4% Mono- and Diglycerides (for example Durem 207 as marketed by the Durkee Company)
0.05% Polysorbate 80

The balance of the product was water.

The test product was prepared as described, with an overrun between 160% and 200%, and with 0.2% by weight table salt (NaCl), principally as a flavor enhancer.

Consumer testing of the resultant test dessert has verified that it is at least comparable, if not superior, to presently available commercial soft serve ice cream. The test dessert has been lauded as creamy, smooth and free of burn. Moreover, the dessert well satisfies the desired deformation and flow properties at home freezer temperatures as discussed above, as well as withstanding prolonged freezer storage. The test product accordingly is indeed readily extrudable, as a continuous extrudate, by hand pressure on a collapsible pliable container, immediately upon removal from prolonged storage in a home freezer.

Laboratory tests support the attainment of new and different material properties with the test dessert, and are believed also attained with the soft serve frozen yogurt product of this invention. The test dessert when prepared with an overrun in the order of 200%, was measured to have a moderately low yield value and a relatively high resistance to lateral deformation. It also exhibited an unusually short relaxation time, which is considered to facilitate extrusion to a cone or dish, even by a first time user of the new dessert. In particular, a measurement comparing the test dessert at 0° F. with conventional soft serve at 20° F. determined that the relaxation time of the test dessert is on the order of ten times shorter than that of conventional soft serve. In one particular measurement, for example, the new test dessert exhibited a relaxation time on the order of two seconds, whereas the conventional product, at the higher temperature at which it operates, exhibited a relaxation time on the order of twenty-five seconds. These tests included conventional ice cream at the store freezer temperature of 0° F., but that product was not extrudable under reasonable pressures and hence no corresponding measurement was obtained of relaxation time.

Viscosity and shear thinning tests on the test dessert of the Test Example revealed that the viscosity of the food product, at 0° F., dropped by a factor on the order of two hundred between the unstressed condition and the stress required to obtain extrusion through a 0.62-inch diameter orifice. In the unstressed condition the viscosity was, as desired, sufficiently high to preclude unwanted flow from the extrusion container and to be coneable after recovery from extrusion. The test also established that the test food product has remarkably shear thinning at 0° F.

A series of standard laboratory cone penetrometer measurements was performed on the foregoing test dessert, conventional soft serve, and two different ice creams, one a standard supermarket brand and the other a frozen pudding which contains alcohol. The test dessert product exhibited the lowest yield value. The measured penetration distances were converted to yield values according to the standard formula $$Y = KL/Z^{1.6}$$

where Y is the yield value in grams per square centimeter, L is the applied cone load in grams, Z is the measured penetration in 1/10 millimeter units, and K is a constant for the particular cone angle.

The accompanying drawing is a semi-log plot of the yield values obtained in this manner for each of the four samples as a function of the temperatures at which the measurements were made. It is noteworthy that the test product, as desired, exhibits a yield value, at the home-freezer temperature range at which it is to be extruded, of the same order of magnitude as the yield value of conventional soft serve at the higher, i.e. 16° F. to 21° F., temperatures at which it is extruded.

A further test determined that the test dessert of the Test Example has flow and deflection properties distinctly different from those of conventional soft serve ice cream, as well as from conventional supermarket ice cream. The test was conducted with the test dessert and with the ice cream at household freezer temperatures, i.e. 0° F., and with the conventional soft serve ice cream at the standard extrusion temperature of 20° F. The supermarket ice cream fractures, rather than bends, when subjected to gravity or other loading force. Conventional soft serve ice cream exhibits progressive plastic bending under these conditions. It hence deforms progressively until the load is removed. The new test dessert, on the other hand, exhibits a distinctly elastic deformation, but of relatively small magnitude. Further, the tests indicate that the test dessert is plastic while under the shear loading for extrusion, but reverts quickly to elastic behavior when the load is removed. Conventional soft serve ice cream, on the other hand, appears to be plastic under all loading conditions when in the normal extrusion temperature range of 16° F. to 21° F.

In a further test on a chocolate flavored variation of the Test Example, samples were initially hardened, subjected to prolonged tempering, i.e., at temperatures not lower than 15° F. for over eighty hours, and then re-hardened. Samples that underwent the full tempering period appeared identical to samples that were subjected to shorter tempering and to samples that were maintained throughout at the hardened condition. The samples thus withstood the tempering, which is considered similar to that likely to be incurred in commercial distribution, without any appreciable deterioration, including without loss of volume, loss of the fine air cell structure, or loss of the fine ice crystal structure.

Extrusion of the soft serve frozen yogurt product of Examples 1 and 2 and of the foregoing test product from a collapsible package and coiling the continuous extrudate onto a cone has demonstrated that the ease of extrusion, the shear-responsive fluidity, the relaxation time and the lateral resistance for successful coneability exist to a similar extent with both the soft serve frozen yogurt and the test product. These observations and demonstrations indicate that the rheological properties of the test dessert, as the foregoing measurements exemplify, are comparable to those of the soft serve frozen yogurt.

It will thus be seen that the objects set forth above, including those made apparent from the preceding description, are efficiently attained. Since certain changes may be made in the composition and the product set forth, and in carrying out the foregoing process without departing from the scope of the invention, it is intended that all matter contained in the above description and shown in the accompanying drawing be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A frozen yogurt product
  A. characterized at least in part by being extrudable and coneable at near 0° F. for serving by extrusion at home freezer temperatures,
  B. consisting essentially, by weight in the absence of significant weight by flavorings, of
    (1) edible triglycerides in a range from 0% to 5%,
    (2) protein in a range from 4% to 5.5%,
    (3) water in a range of 50% to 60%,
    (4) added saccharides in a range from 22% to 30% and including plural saccharides selected from the group consisting of sorbitol, fructose, dextrose, corn syrup, mannitol and sucrose,
    (5) stabilizers in a range from 0.25% to 1.3% and including at least a first stabilizer selected from the group consisting of guar gum, locust bean gum, tara gum, propylene glycol alginate, sodium carboxymethyl cellulose, and other cellulose ethers; a second stabilizer selected from the group consisting of microcrystalline cellulose and cellulose fibers; and a third stabilizer selected from the group consisting of gelatin, xanthan gum, carrageenan, pectin and sodium alginate,
    (6) emulsifiers in a range from 0.45% to 0.775% and including at least a first emulsifier selected from the group consisting of mono- and diglycerides and distilled monoglycerides, and a second emulsifier selected from the group consisting of polysorbate 65, polysorbate 80, and ethoxylated monoglycerides, and
    (7) yogurt culturing means for converting the product to yogurt; and
  C. having a specific gravity in the range of between 0.36 and 0.54.

2. A frozen yogurt product according to claim 1 further characterized in that said saccharides include at least three saccharides selected from the group consisting of sorbitol, fructose, dextrose, corn syrup, mannitol, and sucrose.

3. A frozen yogurt product according to claim 1 further characterized in that said saccharides consist essentially of sorbitol, fructose and corn syrup.

4. A frozen yogurt product according to claim 1 further characterized in that said stabilizers consist essentially of microcrystalline cellulose, locust bean gum, guar gum, hydroxypropylmethyl cellulose, gelatin, and carrageenan.

5. A frozen yogurt product according to claim 1 further characterized in that said emulsifiers consist essentially of mono- and diglycerides, distilled monoglycerides and polysorbate 80.

6. A frozen yogurt product according to claim 1 wherein the yogurt culturing means comprises lactobacillus bulgaricus and streptococcus thermophilus organisms.

7. A frozen yogurt product according to claim 6 further characterized in that
  A. said edible triglycerides are provided at least in major part by butter fat,
  B. said protein is provided at least in major part by non-fat milk solids,
  C. said stabilizers consist essentially of microcrystalline cellulose, locust bean gum, guar gum, hydroxypropylmethyl cellulose, gelatin and carrageenan,
  D. said emulsifiers consist essentially of mono and diglycerides, distilled monoglycerides and polysorbate 80.

8. A frozen yogurt product according to claims 1 or 7 further characterized in that said specific gravity is in the range between 0.38 and 0.44.

9. A frozen yogurt product according to claim 7 further characterized in that said saccharides consist essentially of sorbitol, fructose, and corn syrup.

10. A frozen yogurt product according to claim 7 further characterized in that said stabilizers are present in a range between 0.5% and 1.1%.

11. A frozen yogurt product extrudable and coneable at near 0° F. for serving by extrusion at home freezer temperatures,
  A. said product comprising, by weight in the absence of significant weight of flavorings, edible triglycerides in a range from 0% to 5% and provided at least in major part by butter fat, protein in a range from 4% to 5.5% and provided at least in substantial part by non-fat milk solids, about 4% yogurt culture, and water, and B. said product further consisting essentially of a saccharide system in a range of 22% to 30% and including fructose, sorbitol and corn syrup, C. a stabilizer system in a range from 0.5% to 1.3% and consisting essentially of microcrystalline cellulose, locust bean gum, guar gum, hydroxypropylmethyl cellulose, gelatin and carrageenan, and D. an emulsifier system in a range from 0.45% to 0.775% and consisting essentially of mono- and diglycerides, distilled monoglycerides and polysorbate 80, and E. having a specific gravity in a range between 0.36 and 0.54.

12. A frozen yogurt product extrudable and coneable at near 0° F. for serving by extrusion at home freezer temperatures and comprising, by weight in the absence of significant weight of flavorings, 5% edible triglycerides provided at least in part by butter fat, 13% milk solids not fat provided at least in part as milk and milk powder, 3.8% fructose, 12.5% sorbitol, 8.5% corn syrup solids, 0.25% microcrystalline cellulose, 0.15% gelatin bloom strength 225, 0.075% locust bean gum, 0.05% guar gum, 0.018% carrageenan, 0.39% mono- and diglycerides, 0.06% polysorbate 80, 0.183% salt, 4% yogurt culture consisting essentially of equal parts of lactobacillus bulgaricus and streptococcus thermophilus organisms, and the balance consisting essentially of water, said product being prepared with an overrun between 100% and 200%.

13. A frozen yogurt product according to claim 12 further characterized in that said overrun is between 160% and 200%.

14. A non-fat frozen yogurt product extrudable and coneable at near 0° F. for serving by extrusion at home freezer temperatures and comprising, by weight in the absence of significant weight of flavorings, 11% milk solids not fat provided at least in part by skim milk and milk powder, 3.5% modified whey protein, 4.3% fructose, 12.2% sorbitol, 7.0% 36 DE corn syrup solids, 3.8% 24DE corn syrup solids, 0.45% distilled monoglycerides, 0.26% mono- and diglycerides, 0.065% polysorbate 80, 0.5% microcrystalline cellulose, 0.35% gelatin bloom strength 225, 0.12% hydroxypropylmethyl cellulose, 0.08% locust bean gum, 0.0135% carrageenan, 0.191% salt, 4% yogurt culture consisting essentially of equal parts of lactobacillus bulgaricus and streptococcus thermophilus, and the balance consisting essentially of water, said product being prepared with an overrun between 100% and 200%.

15. A frozen yogurt product according to claim 14 further characterized in that said overrun is between 160% and 200%.

16. A process for preparing a frozen yogurt product extrudable and coneable by extrusion at temperatures near 0° F., said process comprising the steps of:

A. performing a first constituent mix comprising
   about 8.33% fat,
   about 21.66% milk solids not fat,
   about 0.65% mono-and diglycerides,
   about 0.1% Polysorbate 80, and
   water to 100%;

B. the pasteurizing said first constituent mix;

C. homogenizing said pasteurizing first constituent mix;

D. cooling said homogenized first constituent mix;

E. innoculating said first constituent mix with yogurt culture;

F. incubating said innoculated first constituent mix until the titratable acid is, substantially between 1 and 1.6%;

G. forming a second constituent mix comprising (saccharides, stabilizers, salt, and water)
   about 0.9% fructose
   about 31.25% sorbitol,
   about 21.25% 36 DE corn syrup solids,
   about 0.625% microcrystalline cellulose,
   about 0.375% gelatin 225 bloom,
   about 0.1875% locust bean gum,
   about 0.125% guar gum,
   about 0.045% carrageenan,
   about 0.4575% salt, and
   water to 100%;

H. pasteurizing said second constituent mix;

I. cooling said pasteurized second constituent mix to about the incubation temperature of said innoculated first constituent mix;

J. combining said innoculated first constituent mix with said second constituent mix in a ratio of 3 parts first constituent mix to 2 parts second constituent mix; and K. freezing and aerating said final product.

17. The process of claim 16 further comprising the step of adding a third constituent mix comprising dry sugars to said first and second constituent mixes prior to freezing.

18. A process for preparing a frozen yogurt process extrudable and coneable by extrusion at temperatures near 0° F., said process comprising the steps of:

A. forming a first constituent mix comprising:
   about 18.33% milk solids not fat,
   about 0.75% distilled monoglycerides,
   about 0.43% mono-and diglycerides,
   about 0.108% Polysorbate 80, and
   water to 100%;

B. pasteurizing said first constituent mix;

C. homogenizing said pasturized first constituent mix;

D. cooling said homogenized first constituent mix;

E. innoculating said first constituent mix with yogurt culture;

F. incubating said innoculated first constituent mix until titratable acid is substantially between 1 and 1.6%;

G. forming a second constituent mix comprising:
   about 29.8% 36 DE corn syrup solids,
   about 16.2% 24 DE corn syrup solids,
   about 14.9% modified whey protein,
   about 2.128% microcrystalline cellulose,
   about 1.49% gelatin 225 bloom,
   about 0.51% hydroxypropylmethyl cellulose
   about 0.34% locust bean gum,
   about 0.0574% carrageenan,
   about 0.82% salt, and
   water to 100%

H. pasteurizing said second constituent mix;

I. cooling said pasteurized second constituent mix to about the incubation temperature of said innoculated first constituent;

J. combining said innoculated first constituent mix with said second constituent mix;

K. adding a third constituent mix comprising about 74% sorbitol and about 26% fructose to the mix of step J wherein the ratios of the first mix to second mix to third mix in said frozen yogurt are about 3.636:1.424:1, respectively; and L. freezing and aerating said final product.

* * * * *

UNITED STATES PATENT AND TRADEMARK OFFICE
CERTIFICATE OF CORRECTION

PATENT NO. : 4,427,701
DATED : January 24, 1984
INVENTOR(S) : Robert G. Morley

It is certified that error appears in the above-identified patent and that said Letters Patent is hereby corrected as shown below:

Column 3, line 19, change "bondable" to --bendable--.

Column 16, line 8, change "0.9%" to --9.5%--.

Abstract, line 5, delete "is incubated in multiple stages".

References cited, change "Dem et al." to --Dea et al.--.

References cited, change "Den et al." to --Dea et al.--.

Column 1, line 9, before "228,557" change "Nos." to --No.--.

Column 1, line 9, after "now U.S. Pat." change "Nos." to --No.--.

Column 1, line 10, add --Ser. No.-- before "228,550".

Column 14, line 51, add --and-- after "carrageenan".

UNITED STATES PATENT AND TRADEMARK OFFICE
CERTIFICATE OF CORRECTION

PATENT NO. : 4,427,701

DATED : January 24, 1984

INVENTOR(S) : Robert G. Morley

It is certified that error appears in the above—identified patent and that said Letters Patent are hereby corrected as shown below:

Column 15, line 67, delete "pasteurizing" after "said".

Column 16, line 30, change "process" to --product--.

Column 16, line 39, delete "pasturized" after "said".

Signed and Sealed this

Ninth Day of July 1985

[SEAL]

Attest:

DONALD J. QUIGG

Attesting Officer

Acting Commissioner of Patents and Trademarks